(No Model.)

R. M. HUNTER & J. S. DU BOIS.
LAYING UNDERGROUND ELECTRIC WIRES.

No. 244,752. Patented July 26, 1881.

Attests
L. J. Mahos

Inventor
Rudolph M. Hunter &
Josiah S. Du Bois
By their atty

N. PETERS, Photo-Lithographer, Washington, D. C.

UNITED STATES PATENT OFFICE.

RUDOLPH M. HUNTER, OF PHILADELPHIA, PENNSYLVANIA, AND JOSIAH S. DU BOIS, OF HADDONFIELD, NEW JERSEY.

LAYING UNDERGROUND ELECTRIC WIRES.

SPECIFICATION forming part of Letters Patent No. 244,752, dated July 26, 1881.

Application filed March 16, 1881. (No model.)

*To all whom it may concern:*

Be it known that we, RUDOLPH M. HUNTER, of Philadelphia, county of Philadelphia, State of Pennsylvania, and JOSIAH S. DU BOIS, of Haddonfield, in the county of Camden and State of New Jersey, have invented an Improvement in Laying Underground Electric Wires, of which the following is a specification.

Our invention has reference to underground electric wires and the method of laying them; and our invention consists in forming a large main of any suitable material, said main being divided into two compartments in communication throughout their entire length, or in forming in one large main a suitable track upon which a motor may be propelled by steam, electricity, or otherwise; further, in inclosing a number of insulated wires within a thick rubber coating, and laying said rubber tubes and their inclosed wires one upon the other within one chamber of the large main; further, in the method of laying underground electric wires within a tight main, said method consisting in causing a motor to travel from one end of the main to the other, drawing thereafter a line of equal or gradually-increasing strength; and, finally, drawing the section of tubing and its wires through by means of a rope thus transported through the main, and a windlass or equivalent device, all of which is more fully set forth hereinafter, and shown in the accompanying drawings.

The object of our invention is to provide means of adding any number of wires to an underground main already laid and in working order, and without in any way injuring the same.

Heretofore, when permanent mains have been laid, it has been impossible to add extra wires from time to time. Therefore it was required to place within the main, when it was being laid, dozens of wires which might not be in use for years or even at all, and with this object in view the mains have been made with a series of tubes or longitudinal apertures to contain a certain number of wires each.

Figure 1:
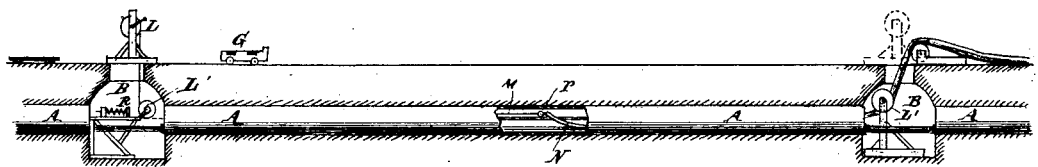
Figure 2:
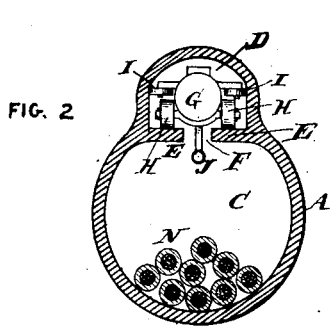
Figure 3:
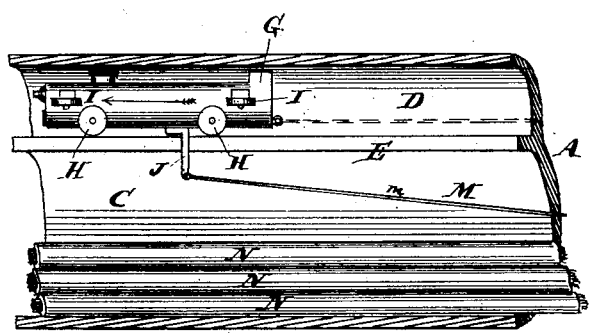
Figure 4:
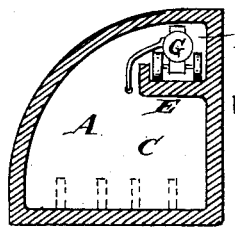
Figure 5:
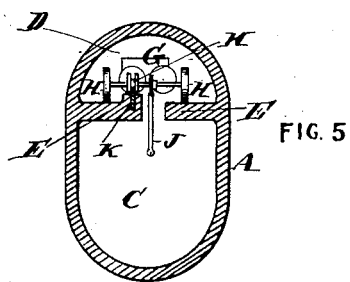
Figure 6:
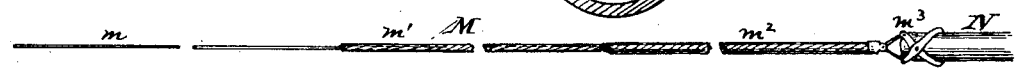
Figure 7:
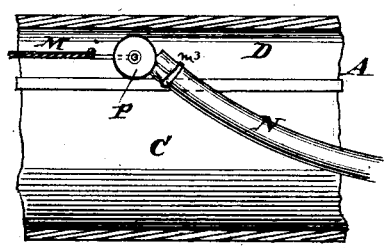
Figure 8:
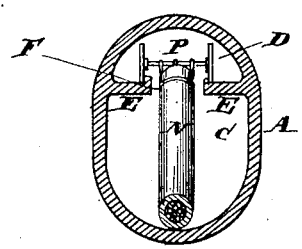
Figure 9:
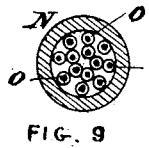

In the drawings, Figure 1 is a longitudinal section of the street, showing method of laying extra wires. Fig. 2 is a cross-section of same. Fig. 3 is an enlarged longitudinal section of part of said main, showing motor at work. Fig. 4 is a modified form of Fig. 2. Fig. 5 shows same adapted to an electric motor. Fig. 6 is an elevation of cable. Figs. 7 and 8 show a method of carrying the end of the tube containing the wires up in the air when being drawn through the main. Fig. 9 is a cross-section of one of the rubber tubes containing the wires.

A is the main, and may be constructed of terra-cotta or other suitable material, and consists of two compartments, C and D, formed by the flanges E, which form the rails or roadbed for the motor G. Between these two flanges E is a longitudinal aperture, the object of which will be more fully set forth hereinafter.

It is not necessary to this invention that there be two decided compartments, since the formation of a motor-road within the main is all which is necessary; but said road must be convenient for laying an extra tube and wires. This tube or main A may be made in sections, which sections are joined together for a length of one or more squares, at the termination of which are stations B, there being no opening necessary from the main A between any two such stations.

The motor G may be driven either by steam or electric force. In the former case it would be provided with wheels H, which run upon flanges E, and side guide-wheels, I, which extend horizontally to guide the motor straight ahead or cause it to follow the contour of the main. This motor is preferably provided with a downwardly-projecting arm, J.

In the case where an electric motor is used a conducting rail, rod, or bar, K, is laid in the road-flanges, upon which conductor flanged wheel H' works, and through which the electricity is conducted to the motor.

If desired, the cable M may be made of wire and conduct the electricity to the motor. We do not limit ourselves to any particular kind of motor.

The cable M may be composed of one or more thicknesses of cord or wire cable. When it is composed of cords varying in strength the lightest is secured to the arm J of the motor, and the length of each of said cords would be about equal to the length of the main between any two stations B.

The cable M may be composed of several sections, $m\ m'\ m^2$, of different weights and strength, and the end of the largest, $m^2$, is secured to the tube N, to be drawn through by clamp $m^3$, or may be secured directly to the small carriage P, provided with the clamp to hold the end of tube N. The carriage P always keeps the end of the tube N up in the motor-chamber and prevents its catching, as shown in Fig. 7. If desired, the cable may be drawn through the motor-chamber alone.

The tubes N are made of rubber or other flexible material capable of keeping out the moisture, and preferably non-conducting to electricity. They may contain about a dozen insulated wires, O, to each tube, and said tubes are made equal in length to the distance between one or more stations B. The windlasses L L are used to draw the tubes N and contents through after the motor has carried the cord through the main A. L' L' are idle-rollers to guide the tube N and cable M.

The operation is as as follows: The mains A being laid permanently, and it is desired to insert a tube of electric wires, the motor G is set upon the roadway in compartment D of the main at one station B, and after the small end of the cable M is secured to it, it is propelled through the main, drawing the cable after it, and received at the next station B, where its momentum may be arrested by any suitable means, as spring-buffers R or their equivalent, or the speed of the motor may be governed and arrested by means of the cable from the station. The cable end is then secured to a windlass, L, or other equivalent device, and wound upon the same until the end of the heavy rope $m^2$ is drawn through. The other end of rope $m^2$ is secured to the tube N or to the carriage P, to which the tube N, containing the electric wires, is secured. This tube may be loosely wound upon a windlass, or may be laid upon the street and moved into the station as it is drawn through the main A. After the sections of tubing N have been drawn in place between two or more stations the wires are electrically connected together so as to form continuous lines, and at these points it is possible to test the wires to determine where a break may occur; and should a wire in one tube become defective in time, that section may be removed and another inserted quickly and without injury to those remaining.

One or two motors would be sufficient to lay all the wires used in a city and keep the same in repair, and the expense would be small, as the same motor and cable would be used indefinitely. With this apparatus it is necessary to have a comparatively large chamber, C, capable of holding a number of tubes N, as shown in Fig. 2; or the chamber may be divided into a number of grooves by projections, as shown in Fig. 4, in which case a single tube would be laid in a single groove; but in any case, whether one or more tubes are to be laid in a single main, the main must be much larger than the tube.

Having now described our invention, what we claim as new, and desire to secure by Letters Patent, is—

1. In an underground main or conductor for electric wires, the closed main A, provided with a road-bed consisting of flanges E or their equivalent, in combination with a self-propelling motor adapted to run upon said road-bed, substantially as and for the purpose specified.

2. An underground main for electric wires, open only at the ends, having a single large longitudinal aperture to contain the wires and an auxiliary longitudinal aperture or road-bed for a motor located above the aperture to contain the wires, in combination with a self-propelling motor provided with means to guide it laterally upon its road-bed, substantially as and for the purpose specified.

3. An underground main for electric wires, provided with a road-bed or tramway located longitudinally therein, and situated at or near the top of the main and above the electric wires located therein, said road-bed being adapted to support and guide a motor, in combination with a self-propelling motor, substantially as and for the purpose specified.

4. In an underground main or conductor for electric wires, the closed main A, provided with compartments C D and road-flanges E, as and for the purpose specified.

5. An underground main or conductor for electric wires, provided with a road-bed for an electric motor and a conducting cable, rod, or bar, or their equivalent, to transmit electricity to said motor, as and for the purpose specified.

6. An underground main for electric wires, consisting of a tube open only at the ends, divided longitudinally into two compartments by horizontal flanges forming a road-bed, said compartments being in communication with each other, in combination with stations located in the circuit of said main, and by which access can be had to the main, substantially as and for the purpose specified.

7. An underground main for electric wires, having a single large longitudinal aperture to contain the wires, and an auxiliary longitudinal aperture adapted to act as a road-bed for a motor, in combination with a motor provided with horizontal guide-wheels to guide said motor through said auxiliary aperture, said main being in communication with the atmosphere only at the ends, as and for the purpose specified.

8. An underground main or conductor to carry electric wires, provided with a road-bed located at or near the top of said main, and forming a longitudinal aperture below said road-bed, in combination with a motor adapted to run upon said road-bed and propel itself, and a cable of gradually-increasing weight and strength attached to said motor, as and for the purpose specified.

9. An underground main or conductor to carry wires, provided with a road-bed for a motor within the same, and located at or near the top of the interior of said main, in combination with a self-propelling motor, a cable attached to said motor, and one or more electric wires, by themselves or inclosed in a flexible tube impervious to moisture, as and for the purpose specified.

10. Apparatus for laying underground electric wires, consisting of a main provided with a road-bed open in the middle, a cable passing through the main and secured at one end to a windlass or its equivalent, and at the other to a carriage or truck, to which is secured the end of conducting-wires to hold the end of same up in the air, substantially as and for the purpose specified.

11. In an underground conductor for electric wires, a main, A, composed of a large longitudinal aperture, and a slotted road-bed located above the same for a motor, combined with one or more heavy flexible tubes, N, of material impervious to moisture, and containing one or more electric wires, as and for the purpose specified.

In testimony of which invention we hereunto set our hands.

RUDOLPH M. HUNTER.
JOSIAH S. DU BOIS.

Witnesses:
R. A. CAVIN,
LISLE STOKES.